United States Patent
Ebergen et al.

(10) Patent No.: US 7,296,176 B1
(45) Date of Patent: Nov. 13, 2007

(54) METHOD AND APPARATUS FOR LIMITING THE NUMBER OF ASYNCHRONOUS EVENTS THAT OCCUR DURING A CLOCK CYCLE

(75) Inventors: Jo C. Ebergen, San Francisco, CA (US); Robert J. Drost, Mountain View, CA (US); William S. Coates, Los Gatos, CA (US); Ian W. Jones, Palo Alto, CA (US)

(73) Assignee: Sun Microsystems, Santa Clara, CA (US)

( * ) Notice: Subject to any disclaimer, the term of this patent is extended or adjusted under 35 U.S.C. 154(b) by 449 days.

(21) Appl. No.: 11/054,279

(22) Filed: Feb. 9, 2005

(51) Int. Cl.
*G06F 1/00* (2006.01)
(52) U.S. Cl. .................. 713/500; 713/501; 713/502
(58) Field of Classification Search ............. 713/500; 327/113
See application file for complete search history.

(56) References Cited

U.S. PATENT DOCUMENTS

| | | | | |
|---|---|---|---|---|
| 4,131,854 A | * | 12/1978 | Schollmeier | 327/114 |
| 4,353,128 A | * | 10/1982 | Cummiskey | 370/301 |
| 6,990,550 B2 | * | 1/2006 | Hesse et al. | 710/313 |
| 2003/0201796 A1 | * | 10/2003 | Ebergen et al. | 326/95 |

* cited by examiner

*Primary Examiner*—Thomas Lee
*Assistant Examiner*—Jaweed A Abbaszadeh
(74) *Attorney, Agent, or Firm*—Park, Vaughan & Fleming LLP

(57) ABSTRACT

One embodiment of the present invention provides a system that limits a maximum repetition rate of an asynchronous circuit. The system operates by receiving a clock signal at a rate-controlling circuit for the asynchronous circuit from a source external to the asynchronous circuit. The system then uses the clock signal to limit the maximum repetition rate of the asynchronous circuit so that only a predetermined number of asynchronous transactions may take place during each cycle of the clock signal.

21 Claims, 2 Drawing Sheets

METHOD AND APPARATUS FOR LIMITING THE NUMBER OF ASYNCHRONOUS EVENTS THAT OCCUR DURING A CLOCK CYCLE

BACKGROUND

The present invention relates to the design of asynchronous circuits.

As computer system clock speeds become increasingly faster, it is becoming progressively harder to synchronize the actions of computer system components with reference to a centralized system clock. To deal with this problem, computer system designers are beginning to investigate the use of asynchronous circuits that operate in a self-timed manner, without having to adhere to the constraints imposed by a centralized system clock. In addition, asynchronous circuits also have other advantages over synchronous circuits, such as reduced power consumption, increased speed and reduced global complexity.

However, there are some difficulties in using asynchronous circuits. One of the difficulties is in maintaining high speeds when remote asynchronous systems are communicating with each other. In such situations, asynchronous circuits typically use some type of asynchronous handshake protocol (with request and acknowledge signals) for each data transfer. Unfortunately, if the distance between the remote asynchronous systems is large, this type of handshake protocol cannot be used while simultaneously maintaining high throughput, because the handshake latency will be too large. Consequently, in such situations, "bursts" of data are typically sent from sender and receiver, and trailing acknowledgements are returned by the receiver, thereby avoiding the large handshake latency problem.

However, if the sender is faster than the receiver, it is possible for the sender to overrun the receiver. Hence, it is desirable for the sender to slow its sending rate to a rate that is acceptable for the receiver. Similarly, if the receiver is much faster than the sender, it is desirable for the receiver to slow the rate at which it sends trailing acknowledgements to the sender.

Various techniques have been used to limit the rate at which one asynchronous system sends information to another asynchronous system. One of these techniques involves introducing an adjustable delay into the asynchronous system. This can be accomplished by inserting capacitors or inverters into the asynchronous circuitry, or by changing the strength of a variable strength inverter in the asynchronous circuitry. However, each of these techniques provides only a limited range of control while greatly complicating the circuit. In the case of analog systems, these additional components can also introduce noise into the system.

Another technique involves using an arbiter to control communications between asynchronous systems. However, the use of an arbiter in an asynchronous system often causes metastability, which can lead to performance problems and errors.

SUMMARY

One embodiment of the present invention provides a system that limits a maximum repetition rate of an asynchronous circuit. The system operates by receiving a clock signal at a rate-controlling circuit for the asynchronous circuit from a source external to the asynchronous circuit. The system then uses the clock signal to limit the maximum repetition rate of the asynchronous circuit so that only a predetermined number of asynchronous transactions may take place during each cycle of the clock signal.

In a variation on this embodiment, while limiting the maximum repetition rate, the rate-controlling circuit does not exhibit meta-stable behavior.

In a variation on this embodiment, limiting the maximum repetition rate of the asynchronous circuit involves allowing an asynchronous control signal, which controls the flow of data through the asynchronous circuit, to fire at most once during each clock cycle of the clock signal.

In a further variation, limiting the maximum repetition rate of the asynchronous circuit involves using a bistable circuit element, with an input coupled to the clock signal and an input coupled to an asynchronous control circuit, to restrict the asynchronous control signal from firing until a cycle of the clock signal completes.

In a further variation, if the maximum repetition rate of the asynchronous circuit is not faster than a frequency of the clock signal, the system disables the rate-controlling circuit.

In a variation on this embodiment, the predetermined number of asynchronous transactions that may take place during each clock cycle is one.

In a variation on this embodiment, the rate-controlling circuit includes at least one GasP module.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Rate-Controlling Circuit

Figure 1A:
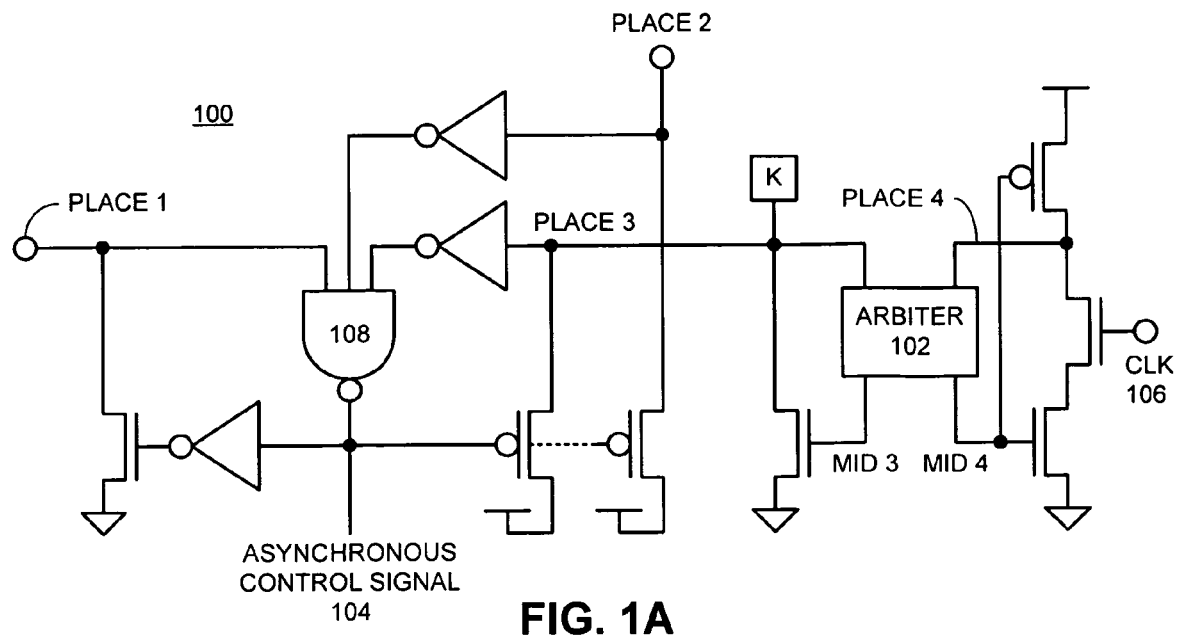
FIG. 1A presents a circuit diagram for a rate-controlling circuit in accordance with an embodiment of the present invention.

FIG. 1A presents a circuit diagram comprising a one-stage GasP rate-controlling circuit in accordance with an embodiment of the present invention. GasP modules are described in more detail in a U.S. Pat. No. 6,707,317 entitled, "Method and Apparatus for Asynchronously Controlling Domino Logic Gates," by Ebergen et al., which is hereby incorporated by reference to describe implementation details of GasP modules.

The asynchronous control circuit 100 illustrated in FIG. 1A receives a combined request/acknowledge signal from an upstream asynchronous control circuit at place 1 and a combined request/acknowledge signals from a downstream asynchronous control circuit at place 2. Note that these downstream and upstream asynchronous control circuits are part of the same local asynchronous circuit (as opposed to a remote asynchronous circuit which may be operating at a different speed from the local asynchronous circuit). Hence, by limiting the rate of the asynchronous control circuit illustrated in FIG. 1A, the system limits the rate at which data can is received from upstream asynchronous circuits and the rate at which data is sent to downstream asynchronous circuits and can thereby decrease the speed of upstream and downstream portions of the local asynchronous circuit.

Asynchronous control circuit 100 also receives a clock signal 106 (see the right-hand side of the circuit). This clock signal 106 is received from a source external to the local asynchronous circuit, and is set to the maximum rate of either (1) the local asynchronous circuit, or (2) a remote asynchronous circuit with which the local asynchronous circuit communicates.

Asynchronous control circuit 100 produces an asynchronous control signal 104 which controls the transfer of data through the local asynchronous circuit, either by activating a latch or some type of enable signal for logic in the local asynchronous circuit.

Figure 1B:
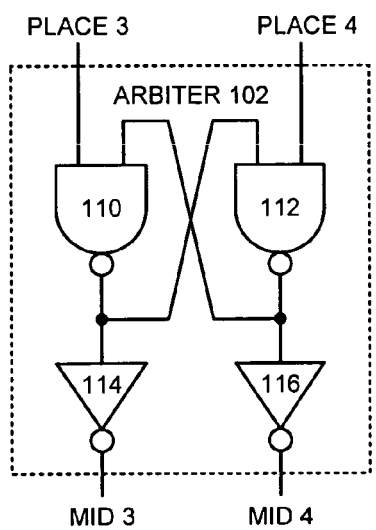
FIG. 1B presents a circuit diagram for an arbiter sub-circuit of the rate-controlling circuit in FIG. 1A in accordance with an embodiment of the present invention.

Asynchronous control signal 104 is driven by NAND gate 108, which only fires if place 1 is high, place 2 is low and place 3 is low. Place 3 is controlled by arbiter sub-circuit 102, which is illustrated in more detail in FIG. 1B.

Arbiter sub-circuit 102 includes a bistable circuit (comprised of a pair of cross-coupled NAND gates 110 and 112) which ensures that place 3 will only be asserted once during each cycle of clock signal 106. Arbiter sub-circuit 102 also includes a pair of low-threshold inverters 114 and 116 to help prevent metastability problems (as is discussed below).

The operation of arbiter sub-circuit 102 is described in more detail below with reference to the timing diagram illustrated in FIG. 2.

Timing Diagram for Rate-Controlling Circuit

Figure 2:
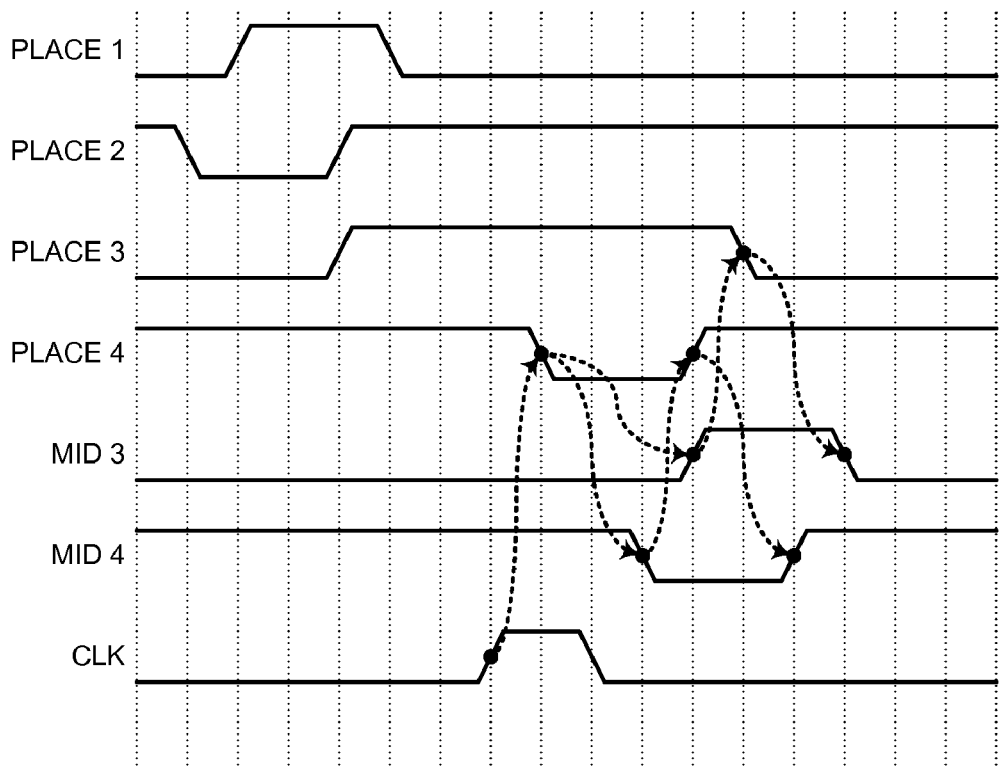
FIG. 2 illustrates a timing diagram for the rate-controlling circuit illustrated in FIG. 1A in accordance with an embodiment of the present invention.

FIG. 2 illustrates a timing diagram for the rate-controlling circuit in accordance with an embodiment of the present invention. At the start of the process: place 1 is low; place 2 is high; place 3 is low; place 4 is high; mid 3 is low; mid 4 is high; and clock signal 106 is low.

Some time later, place 2 is driven low by the downstream asynchronous control circuit. Next, place 1 is driven high by the upstream asynchronous control circuit. This causes NAND gate 108 to assert asynchronous control signal 104 with a low output. This low output causes place 1 to be driven low and causes both place 2 and place 3 to be driven high. These actions cause the inputs to NAND gate 108 to change, which causes asynchronous control signal 104 to become de-asserted (to a high value). Note asynchronous control signal 104 cannot fire again, regardless of what happens to place 1 and place 2, until place 3 returns to a low value. Hence, the circuit remains stable until clock signal 106 goes high.

When clock signal 106 goes high, it causes place 4 to be driven low, which causes the illustrated sequence of operations (represented by the arrows in FIG. 2) to take place. This results in place 3 being reset to a low value, which enables asynchronous control signal 104 to fire again. Hence, clock signal 106 must go through a complete cycle before asynchronous control signal 104 can fire a single time.

Metastability

No meta-stability exists on the outputs of asynchronous control circuit 100 because, even if the rest of the circuit is quiescent, every time clock signal 106 has a pulse, place 4 and mid 4 go through the set of operations illustrated in FIG. 2. There is a chance that place 4 could be just coming out of the operation when place 3 goes high in making a request. If this happens, arbiter sub-circuit 102 can possibly go into a meta-stable state. However, if this happens, the two low-threshold inverters 114 and 116 would reject the meta-stable state, because when there is meta-stability, the two low-threshold inverters 114 and 116 provide consistent outputs. When the next clock pulse comes in, the circuit will proceed as if nothing had happened. So, if there is meta-stability in arbiter sub-circuit 102, the worst thing that can happen is that asynchronous control signal 104 waits an additional clock period before firing again.

Alternative Rate-Controlling Circuit

Figure 3:
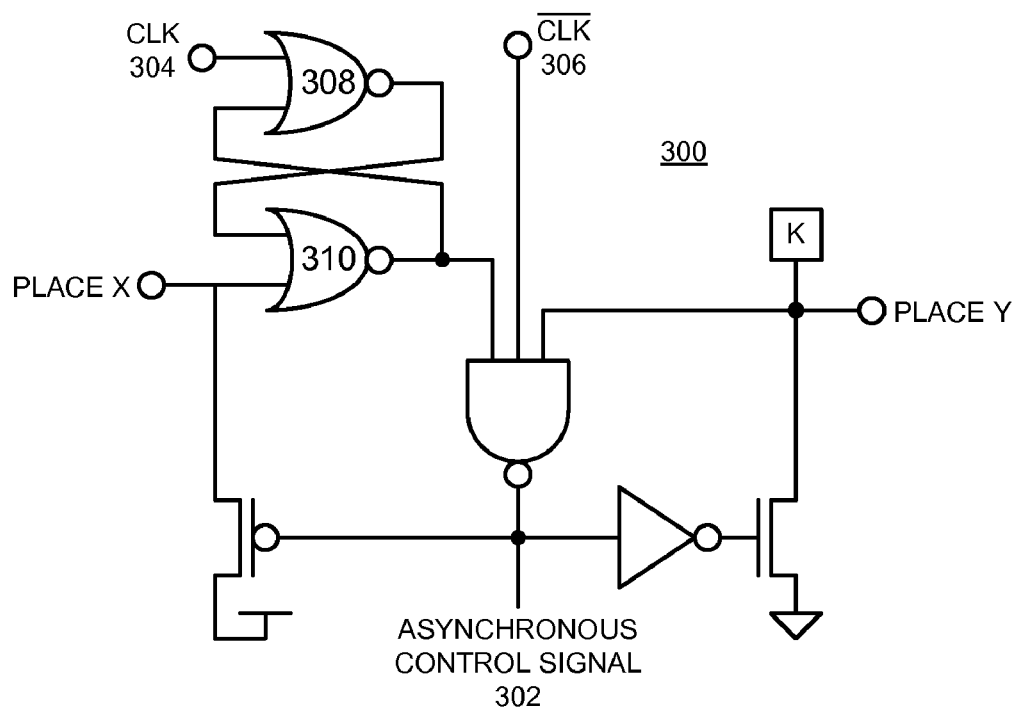
FIG. 3 presents a circuit diagram for an alternative rate-controlling circuit in accordance with an embodiment of the present invention.

FIG. 3 presents a circuit diagram for an alternative asynchronous control circuit 300 in accordance with an embodiment of the present invention. This alternative asynchronous control circuit 300 receives a combined request/acknowledge signal from an upstream asynchronous control circuit at place X and a combined request/acknowledge signals from a downstream asynchronous control circuit at place Y.

Asynchronous control circuit 300 also receives a clock signal 304 and an inverse clock signal 306. These clock signals are received from a source external to the local asynchronous circuit.

Asynchronous control circuit 300 produces an asynchronous control signal 302 which controls the transfer of data through the local asynchronous circuit. In generating this control signal, asynchronous control circuit 300 uses a bistable circuit (including cross-coupled NOR gates 308 and 310) to ensure that only one asynchronous operation takes place for each cycle of clock signal 304.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for limiting a maximum repetition rate of an asynchronous circuit, comprising:

receiving a clock signal at a rate-controlling circuit associated with the asynchronous circuit from a source external to the asynchronous circuit; and using the clock signal to limit the maximum repetition rate of the asynchronous circuit by producing an asynchronous control signal, so that only a predetermined number of asynchronous transactions may take place during each cycle of the clock signal, wherein the production of the asynchronous control signal is based on requests from upstream and downstream circuits.

2. The method of claim 1, wherein while limiting the maximum repetition rate, the rate-controlling circuit does not exhibit meta-stable behavior.

3. The method of claim 1, wherein limiting the maximum repetition rate of the asynchronous circuit involves allowing an asynchronous control signal, which controls the flow of data through the asynchronous circuit, to fire at most once during each clock cycle of the clock signal.

4. The method of claim 3, wherein limiting the maximum repetition rate of the asynchronous circuit involves using a bistable circuit element, with an input coupled to the clock signal and an input coupled to an asynchronous control circuit, to restrict the asynchronous control signal from firing until a cycle of the clock signal completes.

5. The method of claim 1, wherein if the maximum repetition rate of the asynchronous circuit is not faster than a frequency of the clock signal, the method further involves disabling the rate-controlling circuit.

6. The method of claim 1, wherein the predetermined number of asynchronous transactions that may take place during each clock cycle is one.

7. The method of claim 1, wherein the rate-controlling circuit includes at least one GasP module.

8. An apparatus that limits a maximum repetition rate of an asynchronous circuit, comprising:
   a rate-controlling circuit with an input configured to receiving a clock signal associated with the asynchronous circuit from a source external to the asynchronous circuit; and
   wherein the rate-controlling circuit is configured to use the clock signal to limit the maximum repetition rate of the asynchronous circuit by producing an asynchronous control signal, so that only a predetermined number of asynchronous transactions may take place during each cycle of the clock signal,
   wherein the production of the asynchronous control signal is based on requests from upstream and downstream circuits.

9. The apparatus of claim 8, wherein while limiting the maximum repetition rate, the rate-controlling circuit does not exhibit meta-stable behavior.

10. The apparatus of claim 8, wherein the rate-controlling circuit is configured to allow an asynchronous control signal, which controls the flow of data through the asynchronous circuit, to fire at most once during each clock cycle of the clock signal.

11. The apparatus of claim 10,
    wherein the rate-controlling circuit includes a bistable circuit element, with an input coupled to the clock signal and an input coupled to an asynchronous control circuit; and
    wherein the bistable circuit element restricts the asynchronous control signal from firing until a cycle of the clock signal completes.

12. The apparatus of claim 8, wherein if the maximum repetition rate of the asynchronous circuit is not faster than a frequency of the clock signal, the apparatus is configured to disable the rate-controlling circuit.

13. The apparatus of claim 8, wherein the predetermined number of asynchronous transactions that may take place during each clock cycle is one.

14. The apparatus of claim 8, wherein the rate-controlling circuit includes at least one GasP module.

15. A computer system including at an asynchronous circuit and a mechanism that limits a maximum repetition rate of the asynchronous circuit, comprising:
    a processor;
    a memory;
    the asynchronous circuit located within the processor, the memory or within circuitry connecting the processor to the memory; and
    a rate-controlling circuit with an input configured to receiving a clock signal associated with the asynchronous circuit from a source external to the asynchronous circuit;
    wherein the rate-controlling circuit is configured to use the clock signal to limit the maximum repetition rate of the asynchronous circuit by producing an asynchronous control signal, so that only a predetermined number of asynchronous transactions may take place during each cycle of the clock signal,
    wherein the production of the asynchronous control signal is based on requests from upstream and downstream circuits.

16. The computer system of claim 15, wherein while limiting the maximum repetition rate, the rate-controlling circuit does not exhibit meta-stable behavior.

17. The computer system of claim 15, wherein the rate-controlling circuit is configured to allow an asynchronous control signal, which controls the flow of data through the asynchronous circuit, to fire at most once during each clock cycle of the clock signal.

18. The computer system of claim 17,
    wherein the rate-controlling circuit includes a bistable circuit element, with an input coupled to the clock signal and an input coupled to an asynchronous control circuit; and
    wherein the bistable circuit element restricts the asynchronous control signal from firing until a cycle of the clock signal completes.

19. The computer system of claim 15, wherein if the maximum repetition rate of the asynchronous circuit is not faster than a frequency of the clock signal, the computer system is configured to disable the rate-controlling circuit.

20. The computer system of claim 15, wherein the predetermined number of asynchronous transactions that may take place during each clock cycle is one.

21. The computer system of claim 15, wherein the rate-controlling circuit is a two-stage circuit.

* * * * *